June 14, 1938.  F. E. SLOCOMBE  2,120,912
APPARATUS FOR THE INTERMITTENT PRODUCTION OF ROLLED GLASS PLATES
Filed July 7, 1934  4 Sheets-Sheet 2
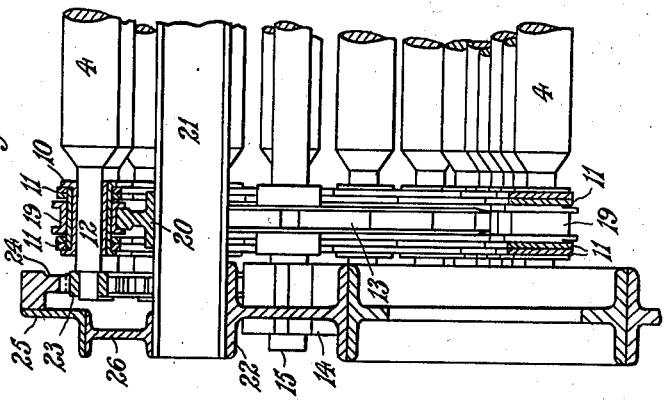
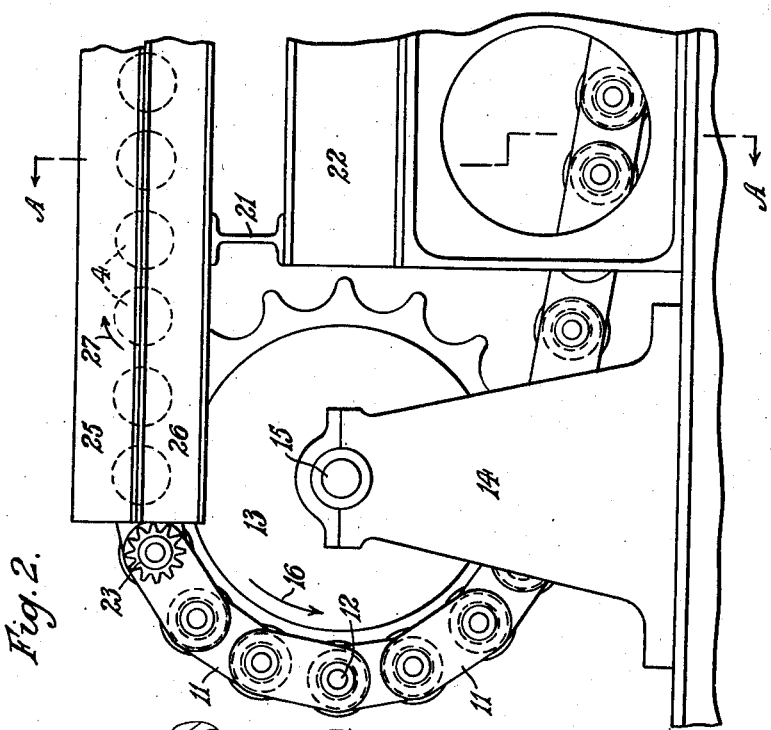

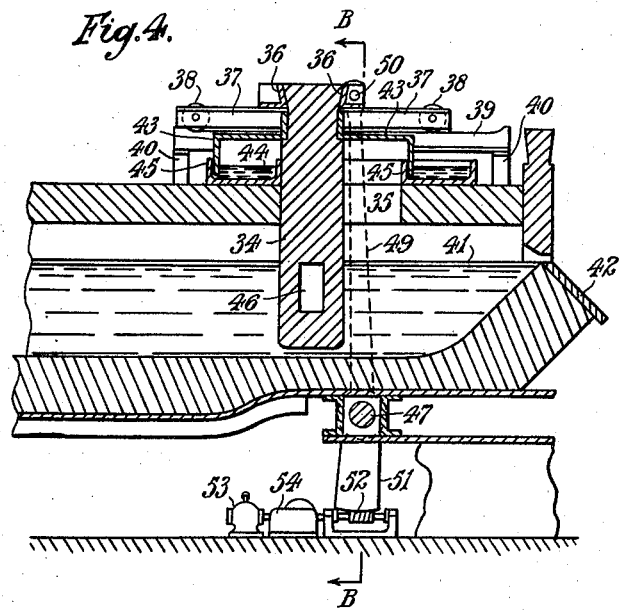
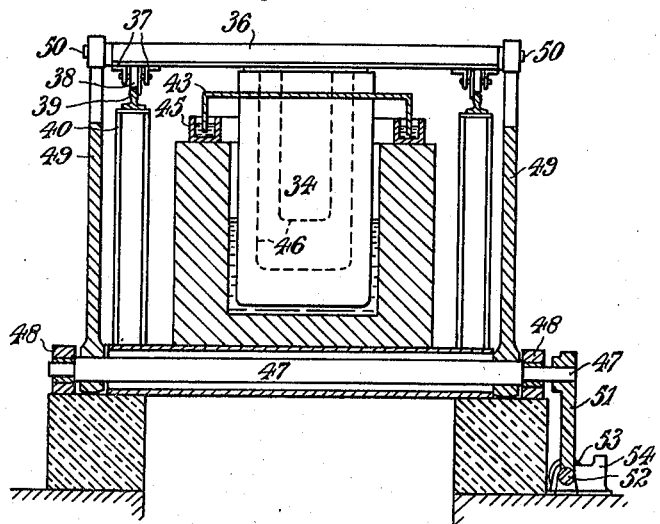

June 14, 1938.  F. E. SLOCOMBE  2,120,912
APPARATUS FOR THE INTERMITTENT PRODUCTION OF ROLLED GLASS PLATES
Filed July 7, 1934  4 Sheets-Sheet 4
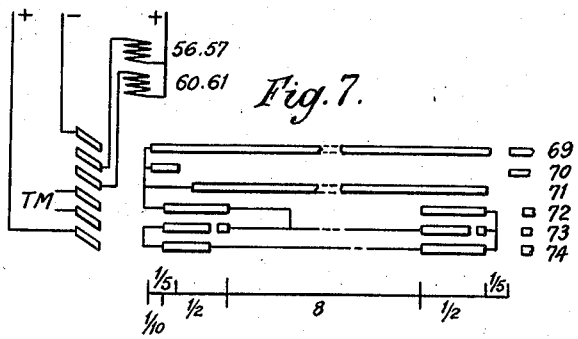
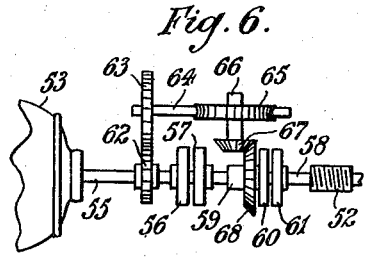
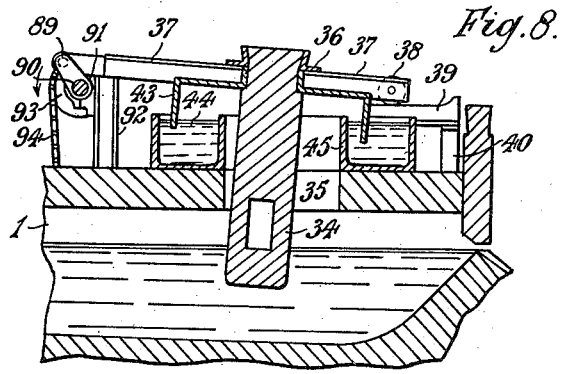
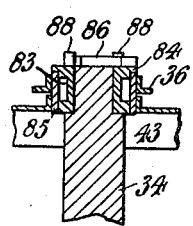
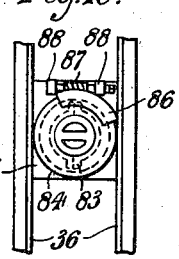
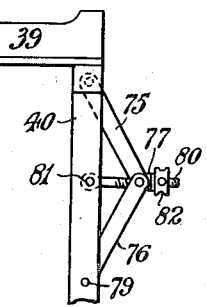
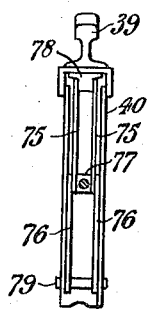
Frank Edwin Slocombe, Inventor.
By Morrison, Kennedy & Campbell,
Attorneys.

Patented June 14, 1938

2,120,912

UNITED STATES PATENT OFFICE 2,120,912

APPARATUS FOR THE INTERMITTENT PRODUCTION OF ROLLED GLASS PLATES

Frank Edwin Slocombe, Doncaster, England, assignor to Pilkington Brothers Limited, Liverpool, England, a British company Application July 7, 1934, Serial No. 734,119
In Great Britain July 14, 1933

18 Claims. (Cl. 49—3)

This invention relates to process and apparatus for the intermittent production of rolled glass plates and has for its object an improved process and apparatus for producing rolled glass plates at a high speed and delivering them on to a lehr bed running at low speed.

It has been proposed to receive glass plates as they are rolled on a roller bed carried on a truck, the rollers turning at a speed corresponding to the low speed of the lehr bed while the truck moves to give the additional speed required. It has also been proposed to receive plates on a roller bed moving at high speed and then to reduce the speed of the bed to that of the lehr bed. It has also been proposed to receive the plate on a roller conveyor, in which the rollers move bodily backwards, while they rotate at a speed giving a resultant forward speed equal to that of the lehr bed, the rolling machine, while delivering the sheet travelling backwards relatively to the conveyor.

According to the invention, glass is fed intermittently to a stationary rolling machine and a plate is rolled therein at high speed. The plate issuing from the machine is received on a roller bed carried on a truck and is transferred therefrom to a low speed roller bed in the lehr. The rollers of the bed carried on the truck rotate continuously forwardly (that is to say in such a direction that the plate on the bed moves towards the lehr) at constant speed and, simultaneously, they are moved bodily backwards by means of a chain travelling continuously at constant speed round pulleys on the truck, the resultant of these two movements being a forward speed equal to that of the lehr bed. While receiving a plate from the stationary rolling machine, the truck is moved forward at a speed which gives its roller bed a resultant forward speed equal to the speed of rolling. The continued forward movement of the truck brings its roller bed into a position adjacent to the lehr bed; the movement of the truck is then stopped and the movement of its roller bed then transfers the plate on to the lehr bed at the speed of the latter.

The truck when in its position for delivering the plate to the lehr bed is preferably within an extension of the lehr tunnel where the plate may be subjected to heating means.

The rolling machine is supplied with the requisite quantity of glass to form a plate of the desired length, by an intermittent glass feeder. The operation of this feeder is synchronized with the movements of the truck, so that the plate is received by the roller conveyor at the correct point of travel of its truck.

Feeders, known as paddle feeders, have been employed for feeding small quantities of glass from the forehearth of a tank to bottle-making and similar machines, but these are unsuited to feeding large quantities required for making plates of glass of commercial dimensions. Thus, in bottlemaking, the weight of glass fed at each operation is of the order of one pound, whereas for plate making, the weight is of the order of 300 pounds. The paddles necessary for feeding such weights of glass are necessarily of large dimensions and must have a long stroke, and a large aperture for the passage and movement of the paddle is therefore required in the roof of the forehearth. In paddle feeders for bottle-making machines this aperture is commonly covered by a plate, but such covering would be quite inadequate in the case of large feeders and would permit the escape of hot gases to such an extent as to make the process impracticable.

According to the invention, the aperture through which the paddle passes into the forehearth is sealed by a water seal, a water trough being mounted above the roof of the forehearth, while an inverted cup-shaped member attached to the paddle dips into the water.

The advantages of the invention are:—

(1) The rolling machine is stationary and can therefore receive its supply of glass directly from a tank.

(2) The lines of support of the plate by the rollers are shifting rapidly and consequently the plate while soft is not deformed as it is when the lines of support are stationary or move slowly.

(3) The rollers and their chain conveyor can be geared together and driven by a single constant speed motor, whereby the resultant speed can be maintained accurately equal to that of the lehr bed.

(4) The speed of travel of the truck from its receiving position to its delivering position is little less than the high speed of rolling, so that the time of exposure of the plate before it reaches the heating means in the extension of the lehr tunnel is a few seconds only.

(5) The whole process of making plates of glass and delivering them on to the lehr bed can be carried out automatically.

In the accompanying drawings:—

Figure 2 is a side view of the left hand end of the conveyor on an enlarged scale;

Figure 3 is a part section thereof on the line A—A of Fig. 2;

Figure 4 is a central vertical section, on an enlarged scale, of the forehearth and feeder, showing details omitted from Figure 1;

Figure 5 is a section thereof on the line B—B of Fig. 4;

Figure 6 is a diagrammatic view of the feeder operating gear;

Figure 7 is a lay-out of the rotary switch;

Figure 8 is a view similar to that of Figure 4 showing an alternative form of paddle actuating device;

Figure 9 is a vertical section of an alternative form of paddle mounting permitting of adjustment;

Figure 10 is a plan view of the same; and

Figures 11 and 12 are side and end views respectively showing a device permitting adjustment of the paddle supporting rails, the nut 82 being omitted from the latter.

Figure 1:
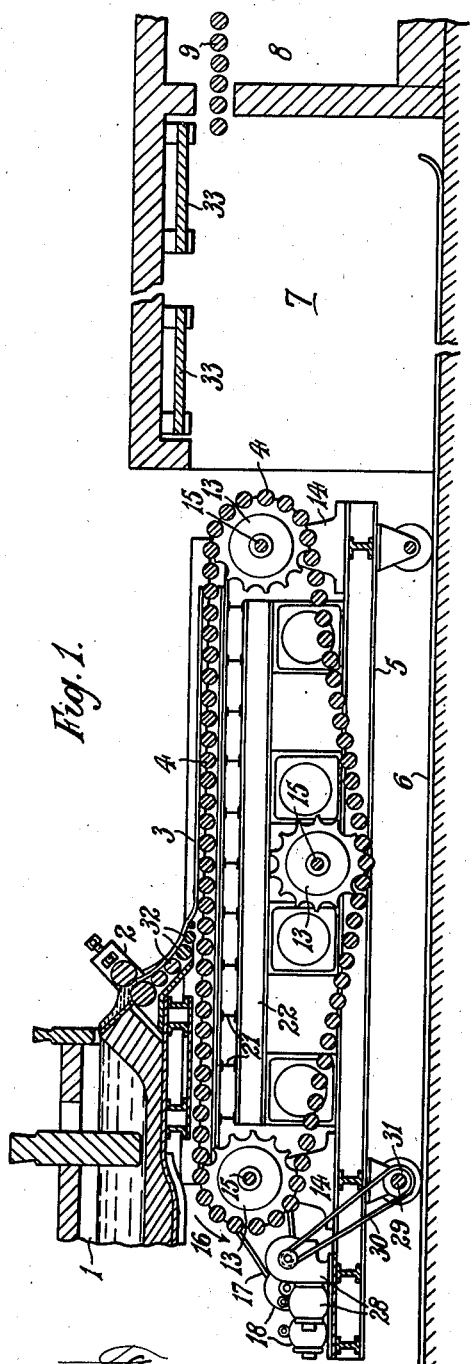
Figure 1 is a central vertical section through the whole apparatus showing, partly broken away, the entrance to the lehr.

Referring to Figure 1, glass from a forehearth 1 is rolled by a rolling machine 2 into a plate 3 which is delivered on to a conveyor composed of rollers 4. The conveyor is on a truck 5 adapted to run on rails 6 into an extension 7 of the lehr 8 where it delivers the plate on to the lehr rollers 9.

Referring also to Figures 2 and 3, the conveyor rollers 4 are carried in bearings 10 in the links 11 of a pair of endless chains, which, being composed of the links 11 and extensions 12 of the rollers, will be herein after referred to as the the chains 11, 12. These chains pass round three pairs of chain wheels 13 on three shafts 15 running in bearings 14 on the framework of the truck 5. The left-hand pair of chain wheels are driven in the direction of the arrow 16 by a chain 17 and motor and gear 18 mounted on the truck 5; the chain 17 engages a chain wheel (not shown) on the far extremity of the shaft 15.

The links 11 of the chains 11, 12 carry rollers 19 adapted to run on rails 20 below the upper horizontal flight of the chains. The rails 20 maintain the rollers 4 in the upper flight in a horizontal plane. They rest on cross girders 21 on longitudinal girders 22 forming part of the framework of the truck 5.

Each roller 4 carries at each end, on its extension 12, outside the chain links 11, a gear wheel 23. The gear wheels 23 engage horizontal racks 24 carried on angle irons 25, on girders 26 which rest on the cross girders 21. By reason of the gear wheels 23 and racks 24, the travel of the rollers 4 from right to left in the upper flight causes the rollers to turn clockwise, while in their flight, in the direction of the arrow 27 (Figure 2). The pitch line of the gear wheels 23 is of smaller diameter than the rollers 4 and therefore the upper surface of the rollers 4 moves to the right by reason of the rotation of the rollers more quickly than the rollers travel to the left. The upper surface of the rollers 4 in the upper flight has, therefore, a resultant slow movement to the right, and the pitch diameter of the gear wheels 23 is so chosen that this resultant movement is equal to the peripheral speed of the lehr rollers 9.

Now the speed of rolling the plate 3 is very much greater than this slow lehr speed and, in order that the conveyor rollers 4 may move to the right at rolling speed, to receive the plate, the truck 5 is driven to the right by means of a motor and gear 28 mounted on the truck and driving the truck axle 29 by chain 30 and chain wheel 31 on the axle 29. The speed at which the truck 5 is driven to the right is less than the speed of rolling of the plate 3 by the resultant speed to the right of the rollers 4, and consequently the upper surface of the rollers 4 moves to the right, while receiving the plate, at the speed of rolling.

To take an example, if the speed of the lehr rollers 9 be 1.25 metres a minute, the speed of rolling the plate 3, 50 metres a minute, and the backward speed of the chains 11, 12, 5 metres a minute, the pitch diameter of the gear wheels 23 must be such as to give the rollers a forward peripheral speed, relative to the chains, of 6.25 metres a minute, and the truck 5 must be driven, while receiving the plate, at 50—1.25 or 48.75 metres a minute.

The operation of this part of the apparatus is as follows:—the motor and gear 18 drives the chains 11, 12 and rollers 4 continuously at constant speed. The truck 5 is stationary; in a position to the left of that shown in Figure 1, the right hand chain wheel 13 being back of the rolling apparatus 2. The motor 28 is then started to drive the truck at such a moment that, as the plate 3 issues from the delivery rolls 32 of the rolling apparatus 2, it is received on the rollers 4 a short distance back of the centre of the right hand chain wheel 13. By the continued travel of the truck 5, the whole plate 3 is received on the conveyor and carried into the extension 7, until the right hand chain wheel is close against the lehr rollers 9. During this travel, the plate will have moved forward, relatively to the truck 5, on the rollers 4, and its front edge will be above the centre of the right-hand chain wheel and as close as possible to the lehr rollers 9. The truck 5 then remains stationary in this position, while the continued travel and rotation of the rollers 4 transfers the plate 3 from the rollers 4 on to the lehr rollers 9, at the speed of the latter. When the plate 3 is clear of the rollers 4, the motor 28 is started in reverse to drive the truck 5 back to its initial position. Heaters 33 are provided in the extension 7 to prevent too rapid cooling of the plate during delivery into the lehr.

Figures 4, 5 and 6 show the aparatus for feeding charges of glass, sufficient for a plate, from the forehearth 1 to the rolling machine 2; the apparatus is especially applicable to the above-described conveying apparatus to make the whole process of production of plates from a tank of glass automatic.

A paddle 34 passes through an aperture 35 in the roof of the forehearth and is supported by two cross angle irons 36. Longitudinal angle irons 37 attached to the angle irons 36 carry at each end rollers 38 adapted to run on rails 39 supported on uprights 40. The paddle 34 is therefore adapted to move forward, from the position shown in Figure 4, to the other end of the aperture 35, and, in so moving, to raise the glass level 41 in front of it and cause a discharge of glass down the chute 42 to the rolling machine 2.

An inverted rectangular cup 43 is attached to the paddle 34 and its lower edge dips in the liquid (preferably water) 44 contained in a four-sided trough 45. The cup and trough form a water seal preventing the escape of gases through the aperture 35. The paddle 34 is preferably heated internally through the passage 46.

The paddle 34 may be actuated by any convenient mechanism. The mechanism shown in Figures 4, 5 and 6 is designed to give the paddle a rapid forward motion to raise the glass level in front of it, and a slow backward motion to prevent any undue change of level on the return stroke. A shaft 47 in bearings 48 carries two arms 49 pivoted at 50 to the two ends of one of the angle irons 36, the arms being slidable about the pivots to permit of their arcual motion. The shaft 47 carries at one end a depending worm sector 51, engaging a worm 52 driven by a motor 53 and gear 54. Figure 6 shows diagrammatically the gear 54 between the motor 53 and worm 52. The motor shaft 55 carries one member 56 of a magnetic clutch of which the other member 57 is on the worm shaft 58. It also carries a gear wheel 62 engaging a gear wheel 63 on a shaft 64, on which is a worm engaging the worm wheel 65 on the shaft 66. This shaft carries a bevel pinion 67 engaging a bevel wheel 68 on a sleeve 59 on the worm shaft 58. On the sleeve 59 is one member 60 of a magnetic clutch of which the other member 61 is on the shaft 58. When the clutch 56, 57 is operative, the motor 53 drives the worm 52 directly, the shaft 58 turning in the sleeve 59. When the clutch 56, 57 is inoperative and the clutch 60, 61 operative, the motor drives the worm through the gears 62, 63 65, 67 and 68, at, comparatively, a very slow speed. In operation, the motor 53 runs continuously, and the clutch 56, 57 is engaged to give the paddle 34 a rapid forward motion and the clutch 60, 61 is engaged to give it a slow backward motion.

In order to operate the whole apparatus automatically, the truck motor 28 and the magnetic clutches 56, 57 and 60, 61 are controlled by a constantly rotating switch, the contacts and brushes of which are shown diagrammatically in Figure 7.

By way of example, a scale of minutes is shown below the contact strips in Figure 7, indicating a total of 9$\frac{3}{10}$ minutes for the cycle determined by the rotating switch. The uppermost brush is connected to the negative main; the next two lower brushes are connected to the magnetic clutches 56, 57 and 60, 61 respectively. The next two lower brushes marked TM are connected to the truck motor 28, and the lowest brush to the positive main. Electrical connections between the contact strips are indicated by single lines. At the start of the cycle of operations (the contact strips being supposed to move to the left under the brushes), contact strip 69 is connected to the negative main, and the clutch 56, 57 is operated by contact strip 70 for one-fifth of a minute, thus causing the paddle 34 to discharge glass to the rolling machine. After a short interval (so determined as to bring the plate 3 on to the rollers 4 in correct position, and shown in Figure 7 as one-tenth minute) contact strip 72 connects one brush of the truck motor to the negative main and contact strips 73, 74 connect the other brush to the positive main, thus starting the truck forwards. The time of forward run of the truck is shown as one-half minute, and, near the end of this time, contact strip 73 is broken and connected to contact strip 72, so as to short-circuit and brake the truck motor. Meanwhile, at a convenient interval after the circuit of the clutch 56, 57 has been broken by contact strip 70, the circuit of the clutch 60, 61 is made by contact strip 71, and the motor 53 then drives the paddle back by its slow motion.

The truck 5 remains stationary for 8 minutes, while delivering the plate to the lehr rollers and, at the end of this period, contact strips 72, 73 and 74 are so connected as to reverse the truck motor and then to short-circuit it to bring it to rest in its back position. After an interval of one-fifth minute the cycle of operations starts again. During the cycle, the conveyor motor 18, the motor 53 and the rolling machine run continuously.

Alternatively, the cycle may be controlled by switches operated by the truck 5 and the plate 3, a switch, caused to operate as the plate leaves the truck, closing the circuit of the truck motor to drive the truck backwards, while the truck, by its travel, closes the circuit of the clutch 56, 57 and reverses the truck motor and then opens the circuit of the clutch 56, 57 and closes that of the clutch 60, 61, the last circuit being opened by a switch controlled by the arms 49.

Figures 11 and 12 show an alternative form of mounting of the rails 39 on the uprights 40, whereby the height of the paddle 34 may be adjusted to vary the amount of glass discharged. The rails 39 are pivoted to the left hand uprights 40 and, at their right hand ends (shown in Figures 11 and 12) can be raised or lowered relatively to the uprights 40 by means of the toggle arms 75 and 76, pivoted together on the sleeves 77, the upper ends of the arms 75 being pivoted to the blocks 78 fixed to the rails 39 and the lower ends of the arms 76 being pivoted at 79 to the uprights 40. Screws 80, pivoted to the uprights 40 at 81 pass through the sleeves 77 which are adjustable on the screws 80 by the nuts 82.

An alternative device for adjusting the discharge of the paddle 34 is shown in Figures 9 and 10. A split collar 83 with flange 84 is fixed to the upper end of the paddle 34, and is adapted to turn in the member 85, to which are attached the cross angle irons 36 and the inverted cup 43. A worm sector 86, fixed to the flange 84 engages a worm 87 mounted in bearings 88 on the member 85. By rotating the worm 87, the paddle can be inclined relatively to the forehearth, so as to vary the gap between its edges and the sides of the forehearth.

An alternative device for operating the paddle 34 is shown in Figure 8. The paddle 34 is supported, as in the device of Figures 4 and 5, by cross angle irons 36 attached to angle irons 37. At the right hand ends, these carry rollers 38 running on rails 39, as before, but at the left hand ends they are pivoted at 89 to a crankshaft 90 carried in bearings 91 fixed to uprights 92. The crankshaft 90 is rotated in the direction of the arrow by a chain wheel 93 and chain 94 driven by a motor (not shown). By this device, the paddle is given a forward movement, passing close to the bottom of the forehearth, while during its backward movement it is at a substantial height above the bottom. The forward and backward movements can therefore be made at the same speed by a revolution of the chain wheel 93 at constant speed.

This device may be operated automatically in conjunction with the truck 5 by mounting a rotary switch on the shaft 90 adapted to break the circuit of the motor driving the shaft when the paddle has reached its backward position. Contact strips 70 and 71 on the rotary switch of Figure 7 are then replaced by a single very short contact strip connected so as to short-circuit the break in the switch on the shaft 90 until the motor driving this shaft has started and turned the switch into its closed position.

The rollers 4 may be rotated by an auxiliary motor, independent of the chain driving motor 18, by means of a chain engaging the gear wheels 23, and, in this case, the resultant forward speed of the roller bed may be adjusted by varying the speed of the auxiliary motor.

In the case that the truck motor 28 is of a non-reversing type, its driving gear is provided with reversing means which may be switch operated.

Having described my invention, I declare that what I claim and desire to secure by Letters Patent is:—

1. Apparatus for making plates of glass comprising a glass tank, high speed rolling machine, a roller bed composed of rollers mounted on endless chains, a truck carrying the roller bed, and a low speed roller lehr, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, and means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position.

2. Apparatus for making plates of glass comprising a glass tank, a high speed rolling machine, a roller bed composed of rollers mounted on endless chains, a truck carrying the roller bed, and a low speed roller lehr, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, a motor adapted to drive the truck at a speed less than the speed of rolling of the plate by the resultant forward speed of the roller bed, and automatic switching means adapted to cause the motor to drive the truck from the rolling machine to its delivery station, retain it there until delivery of the plate has been effected and then drive it back to its initial position.

3. Apparatus for making plates of glass comprising a glass tank, a high speed rolling machine and a feeder adapted to discharge glass intermittently from the tank to the rolling machine, a roller bed composed of rollers mounted on endless chains, a truck carrying the roller bed, and a low speed roller lehr, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, and means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position.

4. Apparatus for making plates of glass comprising a glass tank, a high speed rolling machine, a feeder adapted to discharge glass from the tank to the rolling machine, means for operating the feeder intermittently, a roller bed composed of rollers mounted on endless chains, a truck carrying the roller bed, and a low speed roller lehr, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position, and means for synchronizing the feeder operating means and the truck driving means, so that the plate reaches the roller bed a short distance back of the front end of the bed.

5. Apparatus for making plates of glass comprising a glass tank, a high speed rolling machine, a feeder adapted to discharge glass from the tank to the rolling machine, means for operating the feeder intermittently, a roller bed composed of rollers mounted on endless chains, a truck carrying the roller bed, and a low speed roller lehr, the truck being adapted to travel from the rolling machine to a delivery station adjacent to the lehr, from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, a motor adapted to drive the truck at a speed less than the speed of rolling of the plate by the resultant forward speed of the roller bed, and automatic switching means adapted to start the feeder operating means and in such time and relationship therewith to start the truck motor that the plate reaches the roller bed a short distance back of the front end of the bed, to stop the truck when the truck reaches its delivery station and, when delivery of the plate has been effected, to drive the truck back to its initial position.

6. Apparatus for making plates of glass comprising a glass tank, a paddle movable in a slot in the roof of the forehearth thereof, a high speed rolling machine, members on the paddle and on the roof respectively, constituting a water seal enclosing the slot, means for operating the paddle to discharge glass to the rolling machine, a roller bed composed of rollers mounted on endless chains, a truck carrying the roller bed, and a low speed roller lehr, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, and means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position.

7. Apparatus for making plates of glass comprising a glass tank, a paddle movable in a slot in the roof of the forehearth thereof, a high speed rolling machine, members on the paddle and on the roof respectively, constituting a water seal enclosing the slot, means for operating the paddle to discharge glass to the rolling machine, means for adjusting the depth of the paddle in the glass during its operative movement, a roller bed composed of rollers mounted on endless chains, a truck carrying the roller bed, and a low speed roller lehr, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, and means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position.

8. Apparatus for making plates of glass comprising a glass tank, a paddle movable in a slot in the roof of the forehearth thereof, a high speed rolling machine, members on the paddle and on the roof respectively, constituting a water seal enclosing the slot, means for operating the paddle to discharge glass to the rolling machine, means for rotating the paddle about its vertical axis, a roller bed composed of rollers mounted on endless chains, a truck carrying the roller bed and a low speed roller lehr, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, and means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position.

9. Apparatus for making plates of glass comprising a glass tank, a paddle movable in a slot in the roof of the forehearth thereof, a high speed rolling machine, members on the paddle and on the roof respectively, constituting a water seal enclosing the slot, supporting members for the paddle longitudinal of the forehearth, means for giving the members a slider-crank type of movement to cause the paddle to discharge glass to the rolling machine, a roller bed composed of rollers mounted on endless chains, a truck carrying the roller bed, and a low speed roller lehr, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, and means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position.

10. A machine for making a plate of glass rolled at high speed from molten glass in a tank and delivering it to a low speed lehr, including the combination of means for feeding a charge of glass from the tank to the rolling machine, a chain roller bed for receiving the plate as it is rolled, a truck for carrying the roller bed; means for turning the rollers forwardly and moving them bodily backwardly, both movements being continuous and at constant speed and giving a resultant forward low speed movement, and means for travelling the truck forwardly at a speed giving its roller bed a resultant forward speed equal to the speed of rolling, said means continuing the travel of the truck up to the lehr, retaining it stationary until the plate has been delivered to the lehr, travelling it backwards to a position back of the rolling machine and synchronizing the operation of the feeding device with the movement of the truck.

11. A machine for making automatically a succession of plates of glass rolled at high speed from molten glass in a tank and delivering them to a low speed lehr, including the combination of means for feeding charges of glass intermittently from the tank to the rolling machine, a chain roller bed for receiving each plate as it is rolled, a truck for carrying the roller bed; means for turning the rollers forwardly and moving them bodily backwardly, both movements being continuous and at constant speed and giving a resultant forward low speed movement, and means for travelling the truck forwardly at a speed giving its roller bed a resultant forward speed equal to the speed of rolling, said means continuing the travel of the truck up to the lehr, retaining it stationary until the plate has been delivered to the lehr, travelling it backwards to a position back of the rolling machine and repeating the cycle of movements of the truck, while synchronizing therewith the operation of the feeding device.

12. In or for an apparatus for making plates of glass including a glass tank, a high speed rolling machine, and a low speed roller lehr; a conveyor including a roller bed composed of rollers mounted on endless chains, a truck carrying the roller bed, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, and means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position.

13. In or for an apparatus for making plates of glass including a glass tank, a high speed rolling machine, and a low speed roller lehr; a conveyor including a roller bed composed of rollers mounted on endless chains, a truck carrying the roller bed, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, a motor adapted to drive the truck at a speed less than the speed of rolling of the plate by the resultant forward speed of the roller bed, and automatic switching means adapted to cause the motor to drive the truck from the rolling machine to its delivery station, retain it there until delivery of the plate has been effected and then drive it back to its initial positon.

14. In or for an apparatus for making plates of glass including a glass tank, a high speed rolling machine, a feeder adapted to discharge glass intermittently from the tank to the rolling machine, and a low speed lehr; a conveyor including a roller bed composed of rollers mounted on endless chains, a truck carrying the roller bed, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, and means for driving the truck from the rolling machinery to its delivery station at a speed less than the speed of rolling of the plate by the resultant forward speed of the roller bed, retaining it stationary in the delivery station until delivery of the plate has been effected, and for returning the truck to its initial position.

15. In or for an apparatus for making plates of glass including a glass tank, a high speed rolling machine, a feeder adapted to discharge glass from the tank to the rolling machine, means for operating the feeder intermittently, and a low speed roller lehr; a conveyor including a roller bed composed of rollers mounted on endless chains, a truck carrying the roller bed, the truck being adapted to travel from the rolling machine to a delivery station adjacent to the lehr from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, means for driving the truck from the rolling machine to its delivery station at a speed less than the speed of rolling of the plate by the resultant forward speed of the roller bed, retaining it stationary in the delivery station until delivery of the plate has been effected, and for returning the truck to its initial position, and means for synchronizing the feeder operating means and the truck driving means, so that the plate reaches the roller bed a short distance back of the front end of the bed.

16. In or for an apparatus for making plates of glass including a glass tank, a high speed rolling machine, a feeder adapted to discharge glass from the tank to the rolling machine, means for operating the feeder intermittently, and a low speed roller lehr; a conveyor including a roller bed composed of rollers mounted on endless chains, a truck carrying the roller bed, the truck being adapted to travel from the rolling machine to a delivery station adjacent to the lehr, from which the plate can be delivered to the lehr rollers, means for continuously driving the chains so that the rollers forming the bed travel backwardly in relation to the direction in which the plates issue from the rolling machine, means for continuously rotating the rollers so that the bed which they form has a resultant forward movement equal in speed to that of the lehr rollers, a motor adapted to drive the truck at a speed less than the speed of rolling of the plate by the resultant forward speed of the roller bed, and automatic switching means adapted to start the feeder operating means and in such time and relationship therewith to start the truck motor that the plate reaches the roller bed a short distance back of the front end of the bed, to stop the truck when the truck reaches its delivery station and, when delivery of the plate has been effected, to drive the truck back to its initial position.

17. In an apparatus for making plates of glass including a glass tank, a rolling machine, a lehr, and a conveyor for carrying the sheets of glass from the rolling machine to the lehr; a feeder for discharging glass from the tank to the conveyor, said feeder including a paddle movable in a slot in the roof of the forehearth of the glass tank, members on the paddle and on the roof respectively constituting a water seal enclosing the slot, means for operating the paddle to discharge the glass to the rolling machine, means for adjusting the depth of the paddle in the glass during its operative movements, and means for rotating the paddle about its vertical axis.

18. In an apparatus for making plates of glass including a glass tank, a rolling machine, a lehr, and a conveyor for carrying the sheets of glass from the rolling machine to the lehr; a feeder for discharging glass from the tank to the conveyor, said feeder including a paddle movable in a slot in the roof of the forehearth of the glass tank, members on the paddle and on the roof respectively constituting a water seal enclosing the slot, means for operating the paddle to discharge the glass to the rolling machine, and means for rotating the paddle about its vertical axis.

FRANK EDWIN SLOCOMBE.